No. 765,899.

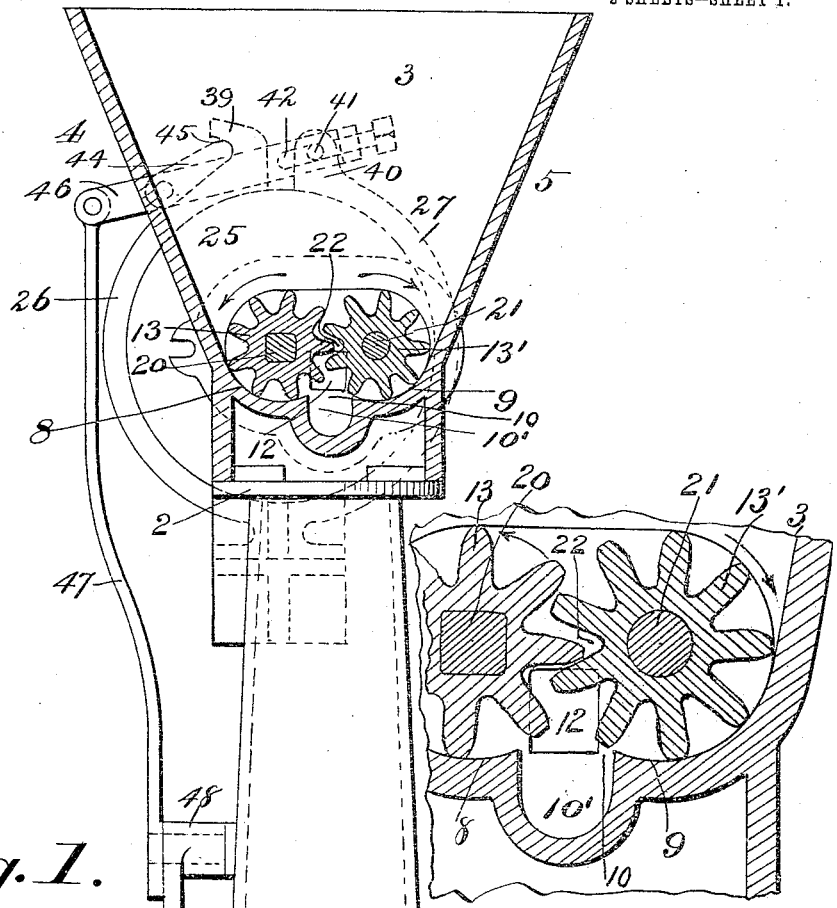

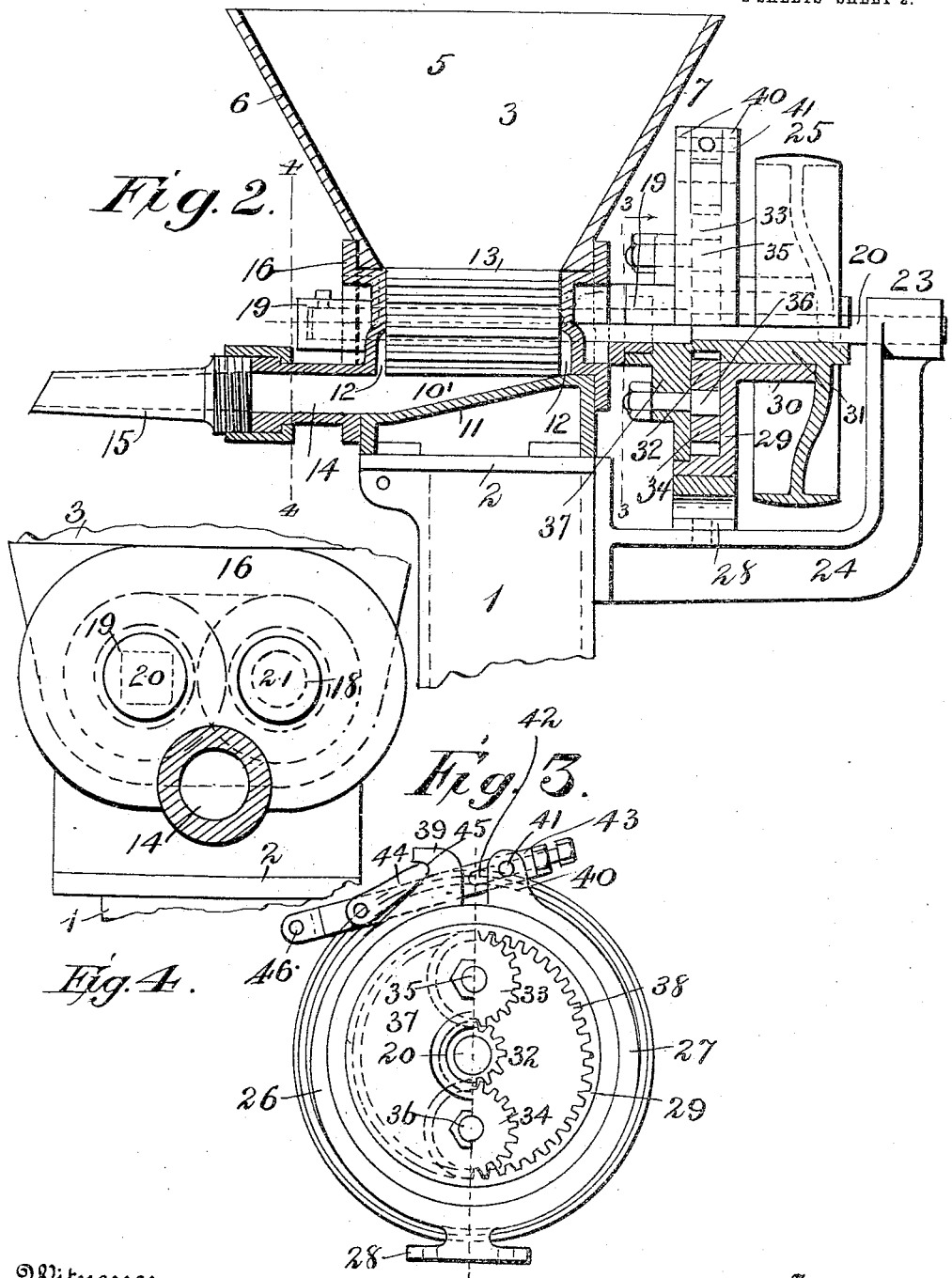

Patented July 26, 1904.

UNITED STATES PATENT OFFICE.

HENRY W. LOUDEN, SR., OF LEBANON, PENNSYLVANIA.

SAUSAGE-STUFFER.

SPECIFICATION forming part of Letters Patent No. 765,899, dated July 26, 1904.

Application filed July 30, 1903. Serial No. 167,591. (No model.)

*To all whom it may concern:*

Be it known that I, HENRY W. LOUDEN, Sr., a citizen of the United States, residing at Lebanon, in the county of Lebanon and State of Pennsylvania, have invented certain new and useful Improvements in Sausage-Stuffers; and I do hereby declare the following to be a full, clear, and exact description of the invention, such as will enable others skilled in the art to which it appertains to make and use the same.

My invention relates to sausage-stuffers or stuffing-machines in which the sausage or other meat is fed continuously into the machine while running instead of while stopped or intermittently, and has for its object a continuous feed of the chopped meat to the casings and the exclusion of air therefrom while the meat is being transferred from the machine or stuffer to the casings; and the invention consists in certain improvements in construction, which will be fully disclosed in the following specification and claims.

In the accompanying drawings, which form part of this specification, Figure 1 represents an end elevation, partly in vertical transverse section, of my improved sausage-stuffer; Fig. 2, a side elevation of the upper part thereof, partly in vertical longitudinal section; Fig. 3, an end view, partly in section, of the gearing and the friction-clutch on an enlarged scale, taken on line 3 3, Fig. 2, looking in the direction of the arrow; Fig. 4, an enlarged end view, partly in section, on line 4 4, Fig. 2; and Fig. 5, a vertical transverse section through the lower portion of part of the hopper and the feeding members, on an enlarged scale.

Reference being had to the drawings and the designating characters thereon, 1 indicates the base or stand, provided with a horizontal flange 2 at its upper end; 3, the hopper, having inclined walls or sides 4 5 6 7, the former two terminating in concave seats 8 9 on opposite sides of the transverse center of the hopper and between which seats is a passage or opening 10, leading to a longitudinally-extending chamber 10', having an inclined bottom 11 and vertical passages 12 in the covers 16 and 17 on each end of the chamber for the passage of meat from the ends of the feeding members 13 13', and from the chamber 10' extends a passage 14 to the spout 15, through which the casings are filled.

The hopper 3 and the chamber 10' are cast integral, and on the ends of the chamber and hopper are detachable covers 16 17, having bearings 18 19 in the former and like bearings in the latter, only one of which is shown, for the shafts 20 and 21, upon which the members 13 13' are supported. Three of these bearings are closed at their ends. The fourth is sealed by the use of a long bearing for the shaft 20 to prevent air entering the space above the members 13 13', thus maintaining a vacuum therein and allowing the pressure of the atmosphere on the meat in the hopper, in conjunction with the gravity thereof, to press the meat into the spaces between the teeth of said members. To afford ready release and delivery of the meat held and carried in the bottom of the spaces between the teeth, I have given the teeth excessive bottom clearance, as shown at 22 in Fig. 5, so that this meat will readily discharge at the ends of the members into the vertical passages 12, the passage 10, and into the chamber 10' as each tooth of the members approaches the horizontal center in each revolution thereof.

The member 13 is preferably mounted upon a squared shaft 20 (and is removable for cleaning when cover 16 is off) and the member 13' upon a round shaft 21, the former being the power-shaft, and the shafts and members are revoluble in opposite directions, as indicated by arrows.

The outer end of shaft 20 is supported in a bearing 23 on a bracket 24, secured to the base or stand 1, and on said shaft is a pulley 25, by which the machine is driven from any suitable source of power through the medium of a belt. (Not shown.)

On the bracket 24 is a friction-clutch, whose concentric and contractible arms 26 27 extend from the base 28 and surround an internally-geared wheel 29, having a hub 30, which surrounds the hub 31 of the pulley 25, and on the